(12) United States Patent
Hsu

(10) Patent No.: US 8,471,829 B2
(45) Date of Patent: Jun. 25, 2013

(54) RESISTIVE TOUCH PANEL

(75) Inventor: Jane Hsu, Taoyuan County (TW)

(73) Assignee: Derlead Investment Ltd., Taipei (TW)

( * ) Notice: Subject to any disclaimer, the term of this patent is extended or adjusted under 35 U.S.C. 154(b) by 224 days.

(21) Appl. No.: 13/114,111

(22) Filed: May 24, 2011

(65) Prior Publication Data

US 2012/0092287 A1  Apr. 19, 2012

(30) Foreign Application Priority Data

Oct. 14, 2010  (TW) .............................. 99219792 U

(51) Int. Cl.
*G06F 3/045*  (2006.01)
(52) U.S. Cl.
USPC .......................................... 345/174; 345/175
(58) Field of Classification Search
USPC .......................................... 345/173–175, 156
See application file for complete search history.

(56) References Cited

U.S. PATENT DOCUMENTS

| 6,305,073 | B1 * | 10/2001 | Badders, Jr. ................... 29/622 |
| 2002/0130849 | A1 * | 9/2002 | Ahn et al. ..................... 345/173 |
| 2009/0201268 | A1 * | 8/2009 | Endo et al. .................... 345/174 |

* cited by examiner

*Primary Examiner* — Joseph Haley
*Assistant Examiner* — Andrew Sasinowski
(74) *Attorney, Agent, or Firm* — Bacon & Thomas, PLLC

(57) ABSTRACT

A resistive touch panel has an upper module, a lower module and a spacer. The upper module has a substrate, an upper touch layer, a top insulation, two upper electrodes and two conductive layers. The two conductive layers are respectively mounted on the two sides of the upper touch layer between the two upper electrodes and the substrate. The lower module has a base, a lower touch layer, a bottom insulation layer and two lower electrodes. The spacer is mounted between the upper touch layer of the upper module and the lower touch layer of the lower module to space apart the upper touch layer of the upper module and the lower touch layer of the lower module. Based on the above structure, the conductive layers in the resistive touch panel are capable of properly sheltering electrodes to prevent the electrodes from being observed.

12 Claims, 4 Drawing Sheets

RESISTIVE TOUCH PANEL

BACKGROUND OF THE INVENTION

1. Field of the Invention

The present invention relates to a resistive touch panel, and more particularly to a resistive touch panel applied with conductive layers, which can properly shelter electrodes of the same to prevent the electrodes from being observed.

2. Description of the Prior Arts

For maximizing convenience brought by modern electronic device, most electronic devices are becoming more and more user-friendly. Therefore, instead of keyboard, touch panel has been overwhelmingly used as input device to control electronic device for user's convenience. Common touch panels are classified into resistive, capacitive, acoustic wave and optical imaging touch panels according to their working principles. Resistive and capacitive touch panels are dominant in the market. However, the resistive touch panel has relatively lower transparency than other touch panels and has disadvantages of being scratch prone and not flame-resistant. Nevertheless, the resistive touch panels occupy a large portion of the market for their low production cost and ease of operation without interruption by glove.

A conventional resistive touch panel has an upper substrate and a lower substrate having similar arrangement as the upper substrate. The upper substrate has a conductive layer, multiple silver electrodes, an annular insulation layer and terminals. The conductive layer is mounted on the bottom of the upper substrate. The silver electrodes are mounted around an edge of the conductive layer and each electrode has a terminal at its end. The annular insulation layer is mounted at the margin of the bottom of the upper substrate aside the silver electrodes. The terminals are respectively mounted on the insulation layer and electrically connect silver electrodes to T-shaped flexible cables. However, the upper substrate is arranged outward after assembly of the touch panel, and the silver electrodes are exposed to users, which is unsightly. Further, the terminals usually protrude from the surface of the insulation layer, resulting in some space formed between the upper and lower substrates to form a contoured surface on the resistive touch panel.

To overcome the shortcomings, the present invention provides a novel resistive touch panel to mitigate or obviate the aforementioned problems.

SUMMARY OF THE INVENTION

The main objective of the invention is to provide a resistive touch panel comprising conductive layers capable of properly sheltering electrodes to prevent the electrodes from being observed.

A resistive touch panel in accordance with the present invention comprises an upper module, a lower module, a spacer, an adhesive layer and a soft circuit board.

The upper module has a substrate, an upper touch layer, a top insulation layer, two upper electrodes and two conductive layers. The upper touch layer is mounted on a bottom of the substrate. The top insulation layer is formed on a margin of the bottom of the substrate around the upper touch layer. The two upper electrodes are respectively mounted at the two sides of the upper touch layer between the upper touch layer and the top insulation layer. The two conductive layers are respectively mounted on the two sides of the upper touch layer between the two upper electrodes and the substrate.

The lower module has a base, a lower touch layer, a bottom insulation layer and two lower electrodes. The lower touch layer spatially corresponds to and aligns with the upper touch layer. The bottom insulation layer is formed on a margin of the top of the base around the lower touch layer. The two lower electrodes are respectively mounted at the two sides of the lower touch layer between the lower touch layer and the bottom insulation layer, wherein the two lower electrodes substantially do not overlap with the two upper electrodes.

The spacer is mounted between the upper touch layer of the upper module and the lower touch layer of the lower module.

The adhesive layer is mounted around the spacer and between the top insulation layer and the bottom insulation layer.

The soft circuit board is attached to the adhesive layer and mounted between the upper module and the lower module and electrically connected to the upper electrodes and the lower electrodes.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
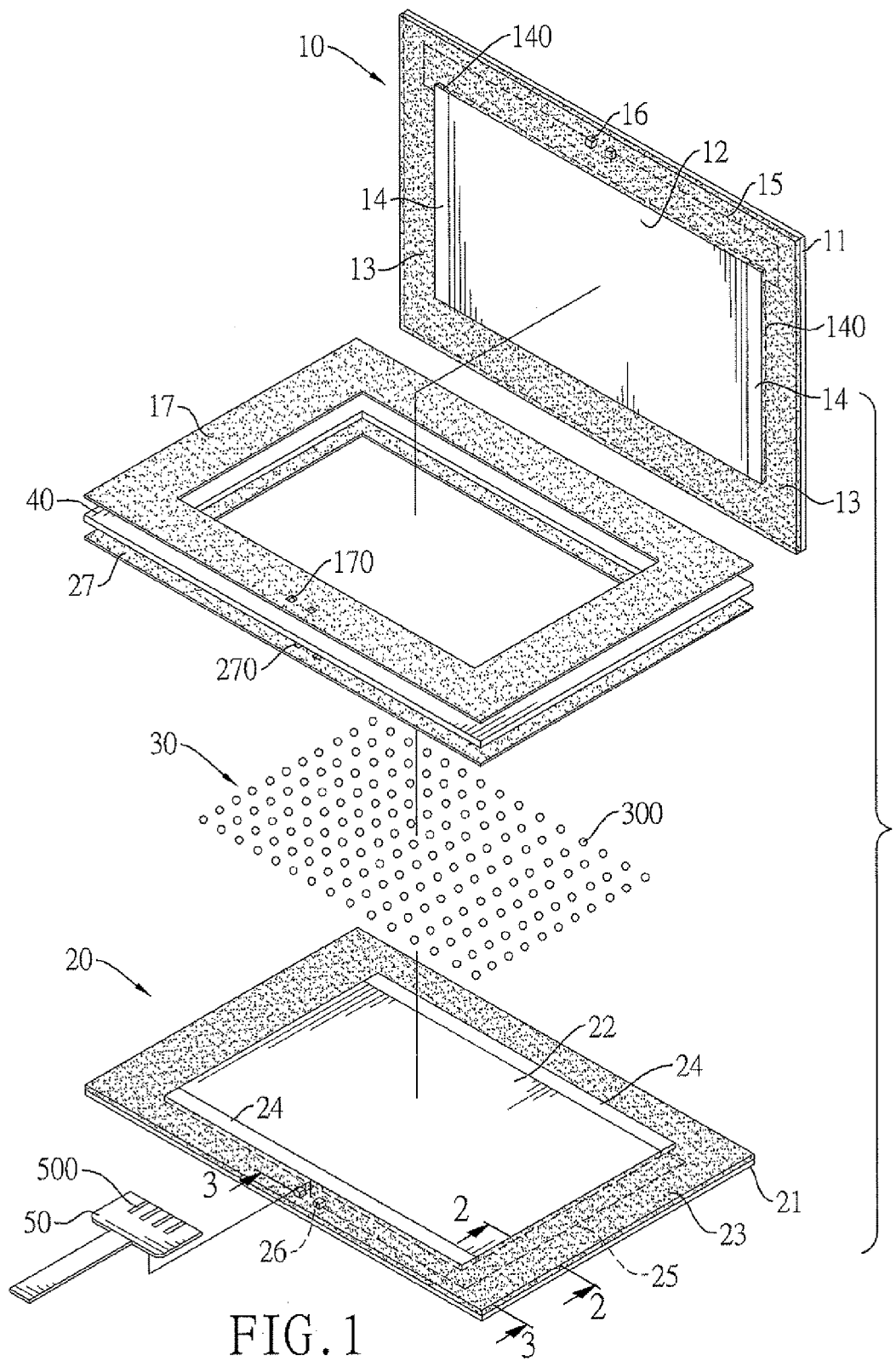
FIG. 1 is an exploded perspective view of an embodiment of the resistive touch panel in accordance with the present invention.

As shown in FIG. 1, a resistive touch panel in accordance with the present invention comprises an upper module 10, a lower module 20, a spacer 30, an adhesive layer 40 and a soft circuit board 50.

Figure 2:
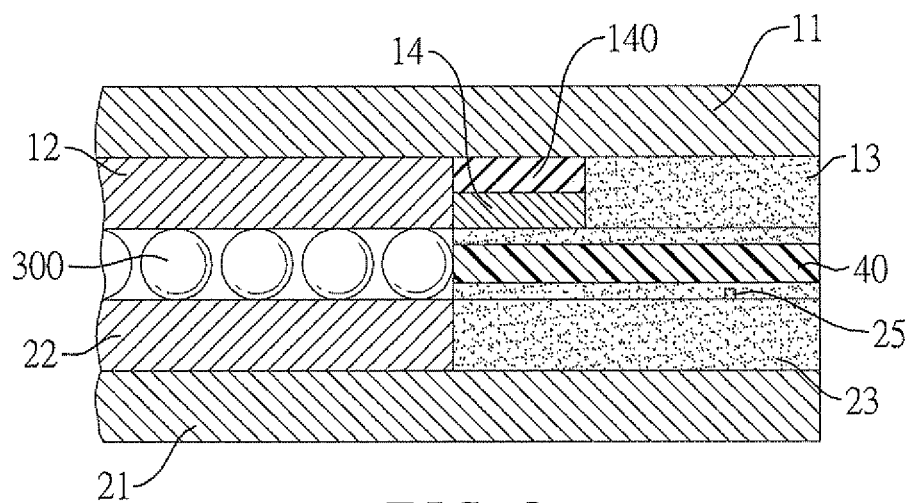
FIG. 2 is a cross sectional side view of the resistive touch panel in FIG. 1 along line 2-2.

With reference to FIGS. 1 and 2, the upper module 10 has a substrate 11, an upper touch layer 12, a top insulation layer 13, two upper electrodes 14, two conductive layers 140, two conductive wires 15, two terminals 16 and a secondary insulation layer 17. The substrate 11 is made of polyethylene terephthalate (PET) or substitutive material thereof and has a bottom and a top. The upper touch layer 12, the top insulation layer 13, the two upper electrodes 14 and the two conductive layers 140 are mounted on the bottom of the substrate 11. The upper touch layer 12 is made of transparent conductive material, such as indium tin oxide (ITO) or substitutive material thereof, and has two sides. The top insulation layer 13 is formed on a margin of the bottom of the substrate 11 around the upper touch layer 12. The two upper electrodes 14 are respectively mounted at the two sides of the upper touch layer 12 between the upper touch layer 12 and the top insulation layer 13. The two conductive layers 140 are made of carbon black, metal powder or substitutive material thereof and respectively mounted on the two sides of the upper touch layer 12. Each conductive layer 140 is between one of the two upper electrodes 14 and the substrate 11.

The lower module 20 has a base 21, a lower touch layer 22, a bottom insulation layer 23, two lower electrodes 24, two conductive wires 25, two terminals 26 and a secondary insulation layer 27. The base 21 is made of glass or substitutive material thereof and has a top. The lower touch layer 22, the bottom insulation layer 23 and the two lower electrodes 24 are mounted on the top of the base 21. The lower touch layer 22 is made of transparent conductive material, such as ITO or substitutive material thereof and spatially corresponds to the upper touch layer 12. The bottom insulation layer 23 is formed on a margin of the top of the base 21 around the lower touch layer 22. The two lower electrodes 24 are respectively mounted at the two sides of the lower touch layer 22 between the lower touch layer 22 and the bottom insulation layer 23. The two lower electrodes 24 substantially do not overlap with the two upper electrodes 14.

Figure 3:
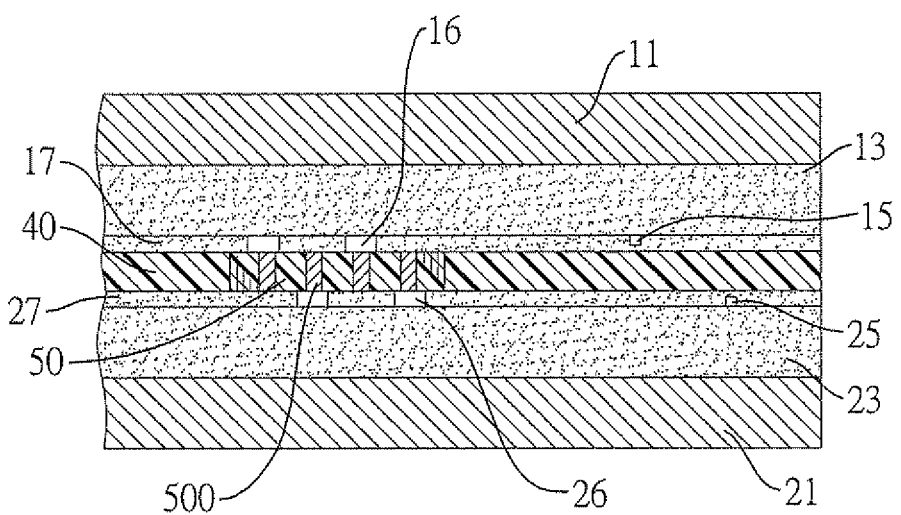
FIG. 3 is a cross sectional side view of the resistive touch panel in FIG. 1 along line 3-3.

With further reference to FIG. 3, each conductive wire 15, 25 is formed on the top insulation layer 13 or bottom insulation layer 23 and has a front end and a rear end. The front end of each conductive wire 15, 25 is connected to a corresponding upper electrode 14 or lower electrode 24. The terminals 16, 26 of the upper module 10 and the lower module 20 are respectively mounted on the top insulation layer 13 and the bottom insulation layer 23. Each terminal 16, 26 is connected to the rear end of the corresponding conductive wire 15, 25 of the upper module 10 and the lower module 20 and protrudes from the corresponding top insulation layer 13 and the bottom insulation layer 23. The secondary insulation layers 17, 27 of the upper module 10 and the lower module 20 are respectively mounted between the upper electrodes 14 and the adhesive layer 40 and the lower electrodes 24 and the adhesive layer 40. Each secondary insulation layer 17, 27 has two through holes 170, 270 and an attaching surface. Each through hole 170, 270 accommodates a corresponding terminal 16, 26 of the upper module 10 or the lower module 20, wherein an exterior surface of each terminal 16, 26 and an exterior surface of the corresponding secondary insulation layer 17, 27 are substantially in the same plane.

The spacer 30 is mounted between the upper touch layer 12 of the upper module 10 and the lower touch layer 22 of the lower module 20 to space apart the upper touch layer 12 of the upper module 10 and the lower touch layer 22 of the lower module 20, and essentially consists of multiple spacer dots 300.

The adhesive layer 40 is mounted around the spacer 30 and between the top insulation layer 13 of the upper module 10 and the bottom insulation layer 23 of the lower module 20, whereby the upper module 10 and the lower module 20 attach to each other tightly.

The soft circuit board 50 is attached to the adhesive layer 40 and mounted between the upper module 10 and the lower module 20 and has four pins 500. Each pin 500 is electrically connected to a corresponding terminal 16, 26 of the upper module 10 and the lower module 20, whereby the upper touch layer 12, the lower touch layer 22 and the conductive wires 15, 25 are electrically connected for the purpose of transmitting signals and electricity.

Figure 4:
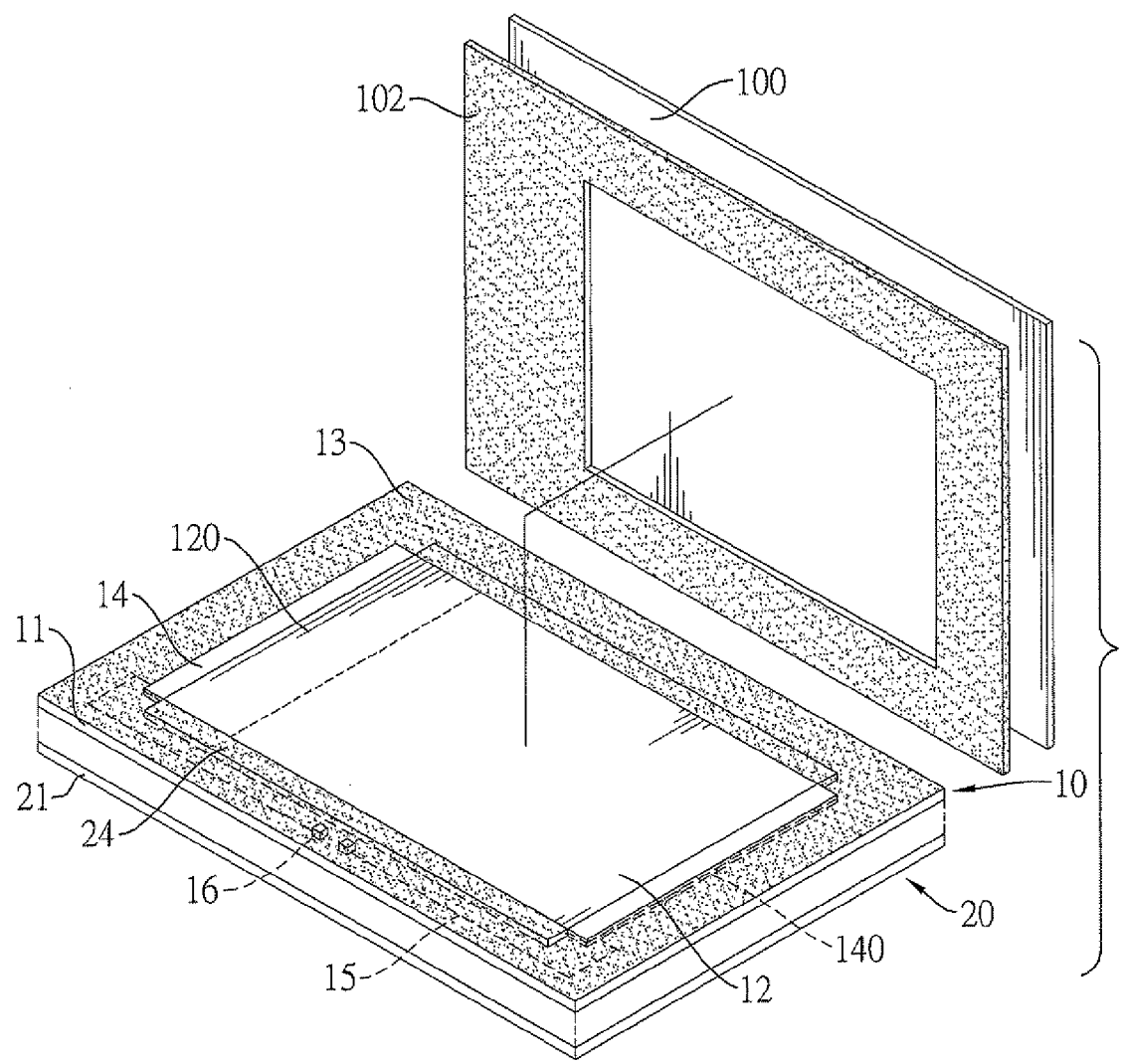
FIG. 4 is another exploded perspective view of the resistive touch panel in FIG. 1.
Figure 5:
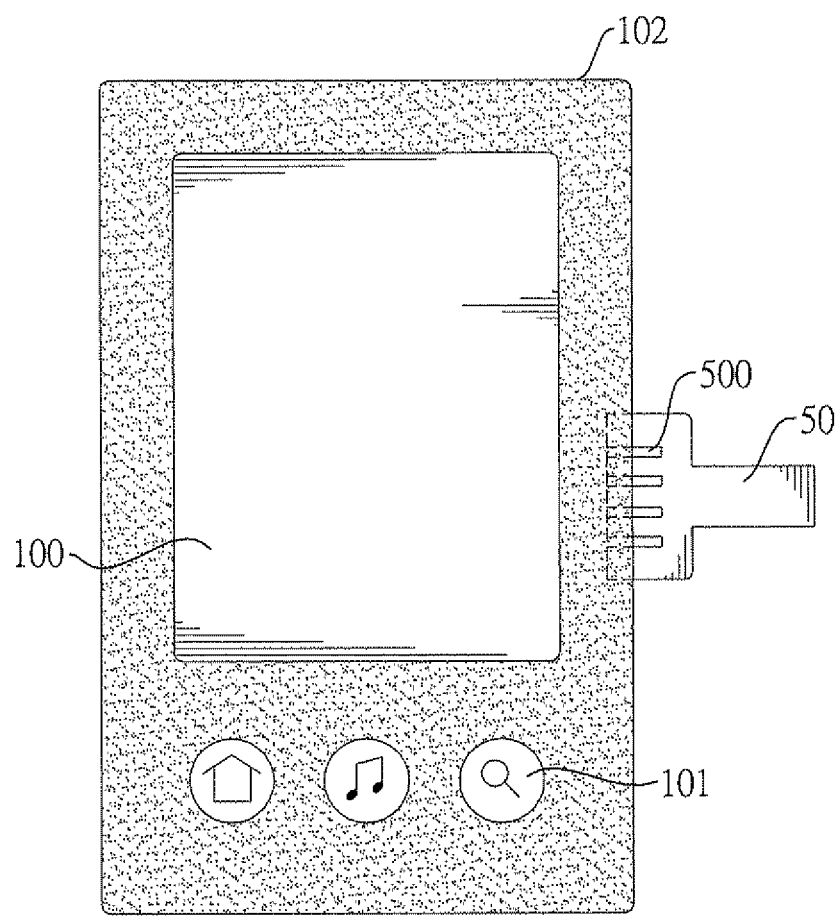
FIG. 5 is a top view of an embodiment of the resistive touch panel in accordance with the present invention.

As shown in FIGS. 4 and 5, in a preferred embodiment of the touch panel in accordance with the present invention, the touch panel further has a pattern layer 100, a tertiary insulation layer 102 and a function region 120. The pattern layer 100 is transparent and mounted on the top of the substrate 11 of the upper module 10 and has at least one icon portion 101. The tertiary insulation layer 102 is mounted between the substrate 11 of the upper module 10 and the pattern layer 100. The tertiary insulation layer 102 is black and has an area. The area of the tertiary insulation layer 102 can be a background of the icon portion 101 to manifest the icon portion 101. The function region 120 is formed in the upper touch layer 12 of the upper module 10 or the lower touch layer 22 of the lower module 20 at position corresponding to the area of the tertiary insulation layer 102. The function region 120 can be programmed by software according to its location on the touch panel during manufacture of a display with the touch panel. Preferably, the icon portion 101 has a pattern representing homepage, musical notation or a search tool.

To sum up, the conductive layer 140 of the upper module 10 is mounted on the upper electrodes 14, whereby the conductive layer 140 shelters the upper electrodes 14, such that the upper electrodes 14 would not be visually exposed to users to hamper aesthetic feeling or perception of users to the touch panel. The through holes 170, 270 of the secondary insulation layer 17, 27 accommodate the corresponding terminals, which avoids formation of a contoured surface as that on the conventional resistive touch panel and provides a steady attachment among the soft circuit board 50, the upper module 10 and the lower module 20 of the touch panel.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A resistive touch panel comprising:
   an upper module having
      a substrate having a bottom and a top;
      an upper touch layer mounted on the bottom of the substrate and having two sides;
      a top insulation layer formed on a margin of the bottom of the substrate around the upper touch layer;
      two upper electrodes respectively mounted at the two sides of the upper touch layer between the upper touch layer and the top insulation layer; and
      two conductive layers, each conductive layer mounted on one of the two sides of the upper touch layer between the one of the two upper electrodes and the substrate;
   a lower module having
      a base having a top;
      a lower touch layer spatially corresponding to the upper touch layer;
      a bottom insulation layer formed on a margin of the top of the base around the lower touch layer; and
      two lower electrodes respectively mounted at the two sides of the lower touch layer between the lower touch layer and the bottom insulation layer;
   a spacer mounted between the upper touch layer of the upper module and the lower touch layer of the lower module;
   an adhesive layer mounted around the spacer and between the top insulation layer and the bottom insulation layer;
   a soft circuit board attached to the adhesive layer and mounted between the upper module and the lower module and electrically connected to the upper electrodes and the lower electrodes.

2. The resistive touch panel as claimed in claim 1, wherein the upper module has
   two conductive wires, each conductive wire of the upper module formed on the top insulation layer and connected to a corresponding upper electrode; and
   two terminals, each terminal of the upper module mounted on the top insulation layer and connected to a corresponding conductive wire of the upper module; and the lower module has
- two conductive wires, each conductive wire of the lower module formed on the bottom insulation layer; and
- two terminals, each terminal of the lower module mounted on the bottom insulation layer and connected to a corresponding conductive wire of the lower module.

3. The resistive touch panel as claimed in claim 2, wherein the touch panel further has
- a pattern layer mounted on the top of the substrate of the upper module and having at least one icon portion;
- a function region formed in the upper touch layer of the upper module or the lower touch layer of the lower module at a position corresponding to the at least one icon portion; and
- a tertiary insulation layer mounted between the substrate of the upper module and the pattern layer.

4. The resistive touch panel as claimed in claim 2, wherein the spacer essentially consists of multiple spacer dots.

5. The resistive touch panel as claimed in claim 2, wherein the soft circuit board has four pins respectively electrically connected to the terminals of the upper module and the terminals of the lower module, whereby the upper touch layer and the lower touch layer and conductive wires are electrically connected.

6. The resistive touch panel as claimed in claim 1, wherein the upper module further has
- a secondary insulation layer mounted between the upper electrodes and adhesive layer and having
  - two through holes, each through hole of the secondary insulation layer of the upper module accommodating a corresponding terminal of the upper module; and the lower module further has
- a secondary insulation layer mounted between the lower electrodes and the adhesive layer and having
  - two through holes, each through hole of the secondary insulation layer of the lower module accommodating a corresponding terminal of the lower module, wherein an exterior surface of each terminal and an exterior surface of the corresponding secondary insulation layer are substantially in the same plane.

7. The resistive touch panel as claimed in claim 6, wherein the touch panel further has
- a pattern layer mounted on the top of the substrate of the upper module and having at least one icon portion;
- a function region formed in the upper touch layer of the upper module or the lower touch layer of the lower module at a position corresponding to the at least one icon portion; and
- a tertiary insulation layer mounted between the substrate of the upper module and the pattern layer.

8. The resistive touch panel as claimed in claim 6, wherein the spacer essentially consists of multiple spacer dots.

9. The resistive touch panel as claimed in claim 6, wherein the soft circuit board has four pins respectively electrically connected to the terminals of the upper module and the terminals of the lower module, whereby the upper touch layer and the lower touch layer and conductive wires are electrically connected.

10. The resistive touch panel as claimed in claim 1, wherein the touch panel further has
- a pattern layer mounted on the top of the substrate of the upper module and having at least one icon portion;
- a function region formed in the upper touch layer of the upper module or the lower touch layer of the lower module at a position corresponding to the at least one icon portion; and
- a tertiary insulation layer mounted between the substrate of the upper module and the pattern layer.

11. The resistive touch panel as claimed in claim 1, wherein the spacer essentially consists of multiple spacer dots.

12. The resistive touch panel as claimed in claim 1, wherein the soft circuit board has four pins respectively electrically connected to the terminals of the upper module and the terminals of the lower module, whereby the upper touch layer and the lower touch layer and conductive wires are electrically connected.

\* \* \* \* \*